Sept. 20, 1955 S. P. GLASSER ET AL 2,718,439
BEARINGS
Filed June 7, 1950
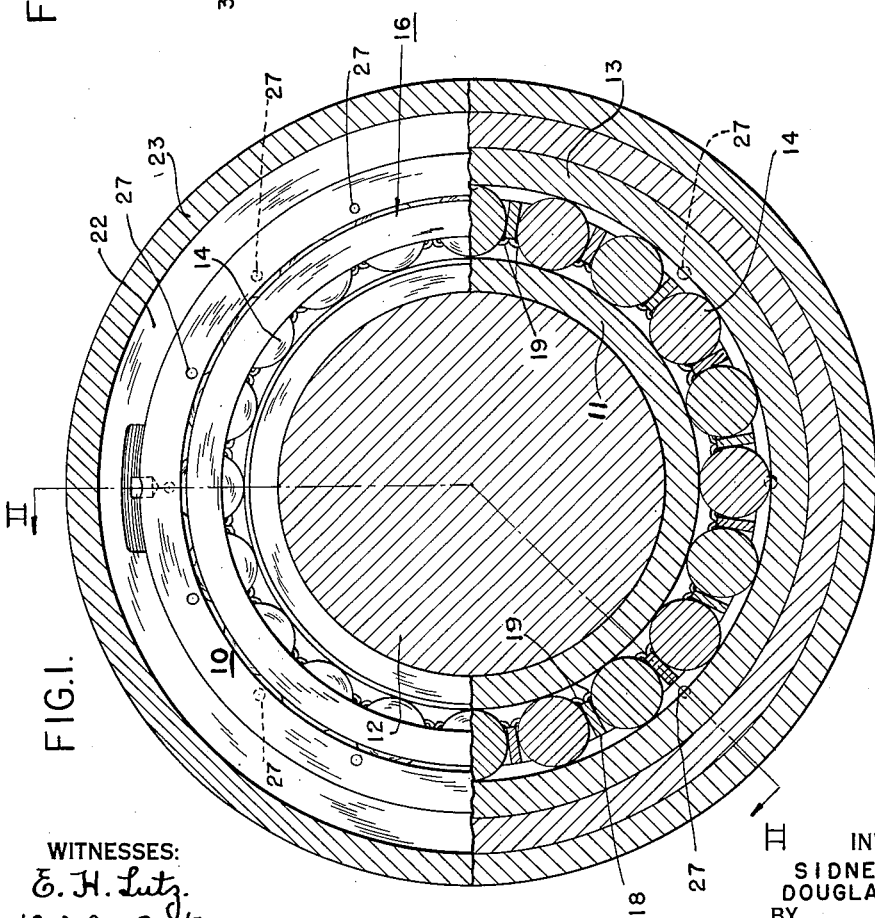
INVENTORS.
SIDNEY P. GLASSER
DOUGLAS JOHNSON
BY
ATTORNEY

United States Patent Office 2,718,439
Patented Sept. 20, 1955

2,718,439
BEARINGS

Sidney P. Glasser, Swarthmore, and Douglas Johnson, Ridley Park, Pa., assignors to Westinghouse Electric Corporation, East Pittsburgh, Pa., a corporation of Pennsylvania Application June 7, 1950, Serial No. 166,722

4 Claims. (Cl. 308—187)

This invention relates to bearings, more particularly to roller bearings in which the rollers are guided on the outer race, and has for an object to provide an improved bearing of this type.

While there are several advantages to a roller bearing whose rollers are guided by the outer race over a bearing whose rollers are guided by the inner race, there has always been present the important disadvantage that with outer-race-guided rollers dirt and foreign matter tends to collect in the outer race and impair operation thereof.

The present invention eliminates this disadvantage through the provision of vent passages from the bottom of the roller-guiding recess in the outer race, these passages providing for discharge therethrough of lubricant originally supplied to the inner race and thrown from the latter to the roller-guiding recess. Discharge of lubricant through the vent passages will flush from the recess any dirt or foreign matter otherwise tending to collect therein.

Furthermore, the vent passages may be so disposed as to direct the discharged lubricant onto adjacent rubbing seals, thereby eliminating the necessity for a separate lubricant supply for such seals.

Accordingly, a further object of the invention is to provide a roller bearing assembly which discharges its lubricant in such a manner as to lubricate another element.

Another object of the invention is to provide means for flushing dirt and foreign matter from the roller-guiding recess of a roller bearing race.

Yet another object of the invention is to provide, in a roller bearing assembly whose rollers are guided by a recess in the outer race, means to prevent puddling of lubricant in the bearing on shutdown of the engine with accompanying elimination of the fire hazard resulting from such lubricant puddling.

These and other objects are effected by the invention as will be apparent from the following description and claims taken in connection with the accompanying drawings, forming a part of this application, in which:

Fig. 1 is a transverse sectional view through a shaft and roller bearing assembly therefor constructed in accordance with the present invention, and taken along the line I—I of Fig. 2, looking in the direction indicated by the arrows; and, Fig. 2 is a sectional view, taken along the line II—II of Fig. 1, looking in the direction indicated by the arrows.

Referring now to the drawings in greater detail, the reference character 10 indicates, in its entirety, a roller bearing assembly comprising an inner race 11 secured on a shaft 12, an outer race 13, an annular series of rollers 14 disposed between the inner and outer races and retaining them in concentric spaced-apart relatively rotatable relation, and a cage structure 16 for retaining the rollers 14 circumferentially-spaced with respect to one another and assembled in the outer race 13.

The cage structure 16 may be of any desired form, and as illustrated comprises a pair of annular side walls 17 disposed in spaced parallel relation at opposite sides of the annular series of rollers 14 and connected by transverse bars 18 separating the rollers circumferentially. Each transverse bar 18 carries a pair of ears 19, the ears of each pair being bent in opposite directions out of the plane of their transverse bar so as to slightly overlie the adjacent rollers 14 to prevent their displacement from the outer race 13 in a radially inward direction.

Preferably, the outer race 13 is of the spherically-seated type and to this end its outer surface 21 lies in the surface of a sphere and is seated in a mating spherically-concaved supporting ring 22 secured in a main casing 23, in a well-known manner.

The outer race 13 is provided with a circumferentially-continuous recess 25 in its inner surface, the width of the recess 25 being slightly greater than the length of the rollers 14 with the latter disposed therein and guided and confined against axial displacement by the recess side walls 26.

One or both of the recess side walls 26 are provided with vent passages 27 therethrough from the bottom of the recess 25 for discharge of lubricant supplied to the rollers adjacent the inner race by suitable means, such as the nozzle 28, and thrown from the rollers to the bottom of the recess 25. In discharging through the vent passages 27, the lubricant will flush the recess 25, removing any dirt or other foreign matter which would tend to collect therein except for the flushing action.

Where the bearing assembly includes rubbing seals, such as shown at 30 by way of example, the vent passages 27 through that side wall 26 of the recess which is adjacent the rubbing seal 30, may be so disposed that the lubricant discharged therethrough is directed onto the rubbing seal to lubricate its area of engagement with the radial surface 31 of the ring 32, thereby eliminating the provision of a separate lubricant supply for the rubbing seal.

While the invention has been shown in but one form, it will be obvious to those skilled in the art that it is not so limited, but is susceptible of various changes and modifications without departing from the spirit thereof.

What is claimed is:

1. In a bearing assembly for a rotatable shaft, an outer race, an annular series of rollers mounted in and guided by the outer race, an inner race adapted to be mounted on a rotatable shaft and on which the rollers are adapted to roll, means for introducing lubricant to the inner race, cage structure associated with the rollers for maintaining the latter in circumferentially-spaced relation, and supporting means for the outer race, said outer race having an inwardly-facing recess throughout the length of its inner face of a width sufficient to receive the rollers, and said outer race also having lateral passages from the bottom of the recess through a side wall of the outer race at spaced locations thereabout, whereby lubricant introduced to the inner race will be thrown to the recess in the outer race for discharge therefrom through said lateral passages.

2. In a bearing assembly for a rotatable shaft, an outer race having a circumferentially-continuous recess in its inner face, an annular series of rollers mounted in and guided by said recess, an inner race adapted to be mounted on a rotatable shaft with the rollers contacting the outer surface thereof, and the outer race having one or more lateral vent passages of circular cross section from the bottom of the recess to the outside of the outer race, whereby lubricant supplied to the rollers and entering the recess may escape from said recess through the vent passages to flush from the recess any foreign matter tending to collect therein.

3. In a bearing assembly for a rotatable shaft, inner and outer races, an annular series of rollers separating said inner and outer races, cage structure maintaining said rollers in circumferentially-spaced relation, the outer race having in its inner face a circumferentially-continuous recess in which the rollers are disposed, and the side walls of said recess having a plurality of circumferentially spaced passages of circular cross section therethrough from the bottom of the recess, whereby lubricant supplied to the rollers and thrown therefrom to the bottom of the recess escapes through the passages and carries along any foreign matter which might otherwise tend to collect in the recess.

4. A high temperature anti-friction bearing comprising inner and outer races with spaced annular working surfaces thereon and multiple rollable bearing elements disposed in the space between said working surfaces, said outer race having an annular internal recess therein, said recess having a bottom wall forming one of said working surfaces and side walls disposed at opposite edges of said bottom wall, one of said side walls having a plurality of circumferentially-spaced holes therethrough communicating with said bottom wall.

References Cited in the file of this patent

UNITED STATES PATENTS

| | | |
|---|---|---|
| 2,074,202 | Benedek | Mar. 16, 1937 |
| 2,132,249 | Van Pelt | Oct. 4, 1938 |
| 2,419,691 | Shafer | Apr. 29, 1947 |

FOREIGN PATENTS

| | | |
|---|---|---|
| 48,380 | Sweden | Jan. 19, 1921 |
| 76,305 | Austria | May 10, 1919 |
| 229,251 | Switzerland | Jan. 3, 1944 |
| 575,996 | Germany | May 5, 1933 |